Figure 1:
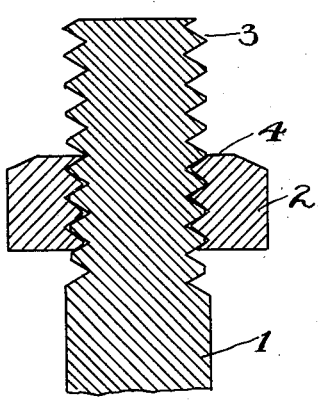

C. C. RYAN.
LOCK NUT AND BOLT.
APPLICATION FILED NOV. 11, 1916.

1,275,478.

Patented Aug. 13, 1918.

Inventor:
Catharine C. Ryan
by C. D. Enochs
Attorney

UNITED STATES PATENT OFFICE.

CATHERINE C. RYAN, OF ST. PAUL, MINNESOTA.

LOCK NUT AND BOLT.

1,275,478.  Specification of Letters Patent.  Patented Aug. 13, 1918.

Application filed November 11, 1916. Serial No. 130,825.

*To all whom it may concern:*

Be it known that I, CATHERINE C. RYAN, a citizen of the United States, and a resident of St. Paul, in the county of Ramsey and State of Minnesota, have invented certain new and useful Improvements in Lock Nuts and Bolts, of which the following is a specification.

One object of my invention is to provide a lock bolt that will uniformly hold a nut that has been drawn up tightly against the object to be retained from loosening and backing off.

Another object of my invention is to provide a lock nut that will stay securely in place when drawn up.

The final object of my invention is to provide a bolt and a nut of such design that when the two are associated together in the ordinary manner, the nut will be maintained uniformly in its position.

With these and incidental objects in view the invention consists of certain novel features of construction and combination of parts, the essential elements of which are hereinafter described with reference to the drawing which accompanies and forms a part of this specification.

In the drawing, Figure 1 is a sectional view of my preferred form of bolt with a standard nut.

Figure 2:
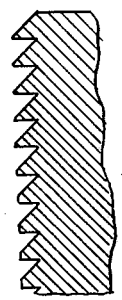
Figure 3:
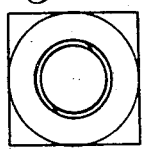

Fig. 2 is a partial sectional view of the same style of bolt with a differing thread. Fig. 3 is a plan view of the nut shown in Fig. 1, and Figs. 4, 5 and 6 are sectional views of different styles of nuts adapted to be used on the bolt shown in Fig. 1.

The bolt 1, Fig. 1, is first made with a V thread, and after the thread is cut, a tapering cut is made along the threaded portion of the bolt, so that the diameter of the bolt on the outside of the thread is greater at the free end than at the end of the threaded portion toward the head of the bolt, but the diameter at the root of the thread is the same as throughout the threaded portion of the bolt.

When this bolt is used with a standard nut, such as 2, Fig. 1, the diameter of the bolt across the thread at 3 is slightly greater than the long diameter of the bolt, so that in forcing the nut 2 over the end 3 of the bolt, the metal of the threads of bolt and nut is compressed, but after the nut reaches the position shown in the drawing, the diameter across the "flat" of the thread of the bolt is slightly less than the long diameter of the nut, so that the pressure is entirely between the surfaces, as shown at the point 4.

It is evident, therefore, that the nut while it will be tight on account of the friction between the threads of the nut and bolt will not be actually bound by compressed metal as it was in passing over the free end of the bolt, but that in backing off of the bolt the V threads of the bolt will have to bite into and compress the metal at the root of the thread of the nut, so that the nut will be locked in its drawn-up position.

Figure 4:

In place of the nut shown in Fig. 1, I may also employ the nut shown in Fig. 4, in which the thread is tapered, as shown, although in the drawing the taper is exaggerated to make it more apparent.

The action of this nut is the same as the one shown in Fig. 1, except that if the taper of the threads of the nut is substantially the same as that of the bolt, the frictional contact will be more uniform throughout the thickness of the nut after it has been drawn into place.

Figure 5:
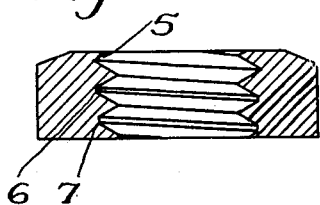

In place of the two styles already shown, I may use that shown in Fig. 5, which has a V-shaped thread at the point 5, but the root of the thread tapers to a "flat" of ever-increasing width toward the other side of the nut, as at 6 and 7.

When the taper of the nut is substantially the same as that of the bolt, the frictional contact is maintained throughout the entire surface of the threads of the nut and bolt after the nut has been drawn into position.

Figure 6:
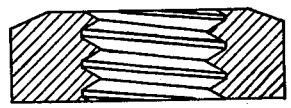

The nut shown in Fig. 6 has the "flat" of the thread uniform throughout the thickness of the nut, and its action would be the same as that of the standard nut shown in Fig. 1, except that the V threads at the free end of the bolts would actually cut into the "flat" of the nut threads, as the nut was being forced on to the bolts, but as the nut passed on to its permanent position, the "flats" would register with the flat portion of the bolt thread.

While I have described my invention and illustrated it in one particular design, I do not wish it understood that I limit myself to this construction, as the application of my invention may be varied in many ways within the scope of the following claim.

Claim:

In combination, a threaded bolt and a threaded nut, the threaded bolt having a uniform thread thereon, except that the outer diameter of the thread decreases uniformly from the free end of the bolt, thus forming an ever-widening "flat" on the outer diameter, the thread of the nut having a uniform short diameter, and having a tapering long diameter with a "flat" at the root of the thread increasing toward the side of the nut having the shortest long diameter.

CATHERINE C. RYAN.